US012380382B2

(12) United States Patent
Dorner et al.

(10) Patent No.: US 12,380,382 B2
(45) Date of Patent: Aug. 5, 2025

(54) SYSTEMS AND METHODS FOR SCHEDULING AND MANAGING HUMAN RESOURCES

(71) Applicant: Schedulehead, Inc., Beaverton, OR (US)

(72) Inventors: Derick Dorner, Dallas, TX (US); Christopher Davis, Dallas, TX (US)

(73) Assignee: Schedulehead, Inc., Beaverton, OR (US)

( * ) Notice: Subject to any disclaimer, the term of this patent is extended or adjusted under 35 U.S.C. 154(b) by 0 days.

(21) Appl. No.: 17/689,192

(22) Filed: Mar. 8, 2022

(65) Prior Publication Data

US 2023/0289678 A1    Sep. 14, 2023

(51) Int. Cl.
*G06Q 10/0631*    (2023.01)

(52) U.S. Cl.
CPC ............. *G06Q 10/063116* (2013.01); *G06Q 10/063112* (2013.01)

(58) Field of Classification Search
None
See application file for complete search history.

(56) References Cited

U.S. PATENT DOCUMENTS

| | | | |
|---|---|---|---|
| 9,280,661 B2 * | 3/2016 | Adjaoute | G06N 5/048 |
| 2002/0188607 A1 * | 12/2002 | Kogut-O'Connell | G06Q 10/109 |
| 2010/0198609 A1 * | 8/2010 | Mellin | G06Q 10/00 705/2 |
| 2011/0125539 A1 * | 5/2011 | Bollapragada | G06Q 10/043 705/7.12 |
| 2011/0276507 A1 * | 11/2011 | O'Malley | G06Q 10/00 705/321 |
| 2012/0078804 A1 * | 3/2012 | Scarborough | G06Q 10/1053 705/321 |
| 2014/0164042 A1 * | 6/2014 | Halvorson | G06Q 10/06313 705/7.17 |
| 2019/0205647 A1 * | 7/2019 | Kumar | G06Q 10/06316 |
| 2020/0327478 A1 * | 10/2020 | Balusani | G06Q 30/08 |
| 2020/0394584 A1 * | 12/2020 | Walsh | G06Q 10/063114 |
| 2021/0406815 A1 * | 12/2021 | Mimassi | G06Q 10/063118 |
| 2022/0092521 A1 * | 3/2022 | Hunter | G06F 40/205 |
| 2022/0180291 A1 * | 6/2022 | Abeykoon | G06Q 10/0631 |

* cited by examiner

*Primary Examiner* — Folashade Anderson
(74) *Attorney, Agent, or Firm* — Thrasher Associates (57) ABSTRACT

Embodiments herein disclose systems and methods for scheduling and managing human resources. The system tracks one or more shifts for one or more empty tasks or staffing spots in an organization and triggers an action upon a detection of at least one predefined event. When triggered, the action includes compiling a list of human resources and communicating with each of the human resources on the list via a suitable channel to receive confirmation of interested human resources to attend the one or more shifts. The action is triggered upon determining that not enough human resources will sign up for the one or more empty spots, or that an admin has not filled the one or more empty spots. Further, the system is configured to facilitate self-scheduling, rate the human resources and perform predictive analysis such as roster utilization predictions and predictive analysis.

15 Claims, 7 Drawing Sheets

SYSTEMS AND METHODS FOR SCHEDULING AND MANAGING HUMAN RESOURCES

TECHNICAL FIELD

The present invention generally relates to workforce management software applications and platforms. More specifically, the present invention relates to systems and methods for scheduling and managing human resources.

PROBLEM STATEMENT AND HISTORY

Interpretation Considerations

This section describes the technical field in detail and discusses problems encountered in the technical field. Therefore, statements in the section are not to be construed as prior art.

DISCUSSION OF HISTORY OF THE PROBLEM

Generally, human resource management platforms are software or combinations of hardware and software that help organizations to manage rosters or staff, and by doing so help to improve productivity and customer responsiveness. Human resource management platforms are called by other names, such as workforce management platforms or employee management platforms.

Although there are various human resource management platforms, there are no platforms that efficiently manage large rosters of irregularly scheduled staff, thus being limited in effectiveness. For these organizations and those that face similar challenges, human resource management of the organization is usually conducted on an ad-hoc basis and relies either on manual distribution of work-related assignments or standardized routing rules in an automated framework. However, this manner of distribution of work is not optimal.

Further, available human resource management platforms attempt to address the aforementioned need, but are limited in the scope of variables able to be considered at a given time.

Accordingly, there exists a need for systems and methods that automate complex scheduling and communication to efficiently manage human resources such as contractors and employees.

SUMMARY

The above objective is solved by a system and a method for scheduling and managing human resources as defined in the claims.

The system for scheduling and managing human resources comprises a human resource management module. The human resource management module comprises a registration and tracking block, a schedule block, a rating block and an intelligence block. The registration and tracking block tracks at least a first shift for at least a first empty spot in an organization and triggers an action when required to define a triggered action. The triggered action includes compiling a list of human resources based on at least one factor; and communicating with each of the human resources on the list via a suitable channel to receive confirmation of interested human resources to attend the first shift. The registration and tracking block triggers the action upon determining that not enough human resources will sign up for the first empty spot, or that an admin has not filled the first empty spot, where at least one parameter is staffing velocity of a particular event vs the organization's average, roster utilization, and/or availability of the human resources to take the first shift.

The schedule block is configured to facilitate self-scheduling and display one or more filtered shifts to a human resource based on selectivity, said selectivity is modifiable based on the situation. The rating block is configured to determine rating based on one or more data points and the intelligence block is configured to predict one or more instances. The one or more data points include: actual star ratings given by the admin after each shift to the human resources, seniority, late comings, absents, total shifts served, total shifts served in a specific capacity, recent ratings, feedback comments and location data and the one or more instances include client event density and roster utilization.

The method for scheduling and managing resources comprises tracking at least a first shift for at least a first empty spot in an organization and triggering an action when required. Triggering the action comprises compiling a list of human resources based on at least one factor and communicating with each of the human resources on the list via a suitable channel to receive confirmation of interested human resources to attend the first shift, wherein the action is triggered upon determining that not enough human resources will sign up for the first empty spot, or that an admin has not filled the first empty spot.

The method further comprises facilitating self-scheduling and displaying one or more filtered shifts to a human resource based on selectivity, said selectivity is modifiable based on situation. The method further comprises determining rating based on one or more data points, wherein the one or more data points include: actual star ratings given by the admin after each shift to the human resources, seniority, late comings, absents, total shifts served, total shifts served in a specific capacity, recent ratings, feedback comments and location data. The method further comprises predicting one or more instances, wherein the one or more instances correspond to client event density and roster utilization.

The present invention also discloses roster utilization predictions based on a plurality of datasets, a stored worker dataset and a historical analytics dataset. The plurality of datasets corresponds to a rating dataset, a qualitative dataset, a quantitative dataset, and an engagement dataset. The roster utilization predictions occur by: predicting a number of available human resources with each criteria by utilizing the plurality of datasets and the stored worker dataset; predicting probable number of the human resources that will sign up based on recent and historical work engagement; creating a predicted and current schedule needs based on the historical analytics dataset; and creating suggestions and warnings based on both current needs and predicted needs by comparing different situations.

The present invention further discloses predictive analysis based on the plurality of datasets and a historical analytics dataset. The predictive analysis is done by: creating a score on each criteria by combining performance data of the human resource; and projecting scores based on recent trends in the human resource's behavior, and information related to the organization's current open spots.

Of course, the present is simply a Summary, and not a complete description of the invention.

BRIEF DESCRIPTION OF THE DRAWINGS

Various aspects of the invention and its embodiment are better understood by referring to the following detailed description. To understand the invention, the detailed description should be read in conjunction with the drawings.

DESCRIPTION OF AN EXEMPLARY PREFERRED EMBODIMENT

Interpretation Considerations

While reading this section (Description of An Exemplary Preferred Embodiment, which describes the exemplary embodiment of the best mode of the invention, hereinafter referred to as "exemplary embodiment"), one should consider the exemplary embodiment as the best mode for practicing the invention during filing of the patent in accordance with the inventor's belief. As a person with ordinary skills in the art may recognize substantially equivalent structures or substantially equivalent acts to achieve the same results in the same manner, or in a dissimilar manner, the exemplary embodiment should not be interpreted as limiting the invention to one embodiment.

A processor is configured to execute instructions stored in the memory and to perform various processes based on several processor technologies known in the art. Examples of the processor include, but not limited to, an X86-based processor, a Reduced Instruction Set Computing (RISC) processor, an Application-Specific Integrated Circuit (ASIC) processor, and a Complex Instruction Set Computing (CISC).

Memory includes suitable logic, circuitry, interfaces, and/or code that may be configured to store the set of instructions, which are executed by a processor. Preferably, the memory is configured to store one or more programs, routines, or scripts that are executed in coordination with a processor. Additionally, the memory may be implemented based on a Random Access Memory (RAM), a Read-Only Memory (ROM), a Hard Disk Drive (HDD), a storage server, and/or a Secure Digital (SD) card, or other means known and foreseeable to those of ordinary skill in the computing arts.

The discussion of a species (or a specific item) invokes the genus (the class of items) to which the species belongs as well as related species in this genus. Similarly, the recitation of a genus invokes the species known in the art. Furthermore, as technology develops, numerous additional alternatives to achieve an aspect of the invention may arise. Such advances are incorporated within their respective genus and should be recognized as being functionally equivalent or structurally equivalent to the aspect shown or described.

A function or an act should be interpreted as incorporating all modes of performing the function or act, unless otherwise explicitly stated. For instance, sheet drying may be performed through dry or wet heat application, or by using microwaves. Therefore, the use of the word "paper drying" invokes "dry heating" or "wet heating" and all other modes of this word and similar words such as "pressure heating".

Unless explicitly stated otherwise, conjunctive words (such as "or", "and", "including", or "comprising") should be interpreted in the inclusive and not the exclusive sense.

As will be understood by those of the ordinary skill in the art, various structures and devices are depicted in the block diagram to not obscure the invention. In the following discussion, acts with similar names are performed in similar manners, unless otherwise stated.

The foregoing discussions and definitions are provided for clarification purposes and are not limiting. Words and phrases are to be accorded their ordinary, plain meaning, unless indicated otherwise.

DESCRIPTION OF THE DRAWINGS, A PREFERRED EMBODIMENT

The present invention provides systems, software and methods that automate complex scheduling, payroll processes, and communications involving a group of human resources. Advantageously, organizations (including companies) that have large rosters and/or irregularly scheduled staff will be able to efficiently schedule and manage human resources, such as workers, contractors, volunteers, and other persons.

Figure 1:
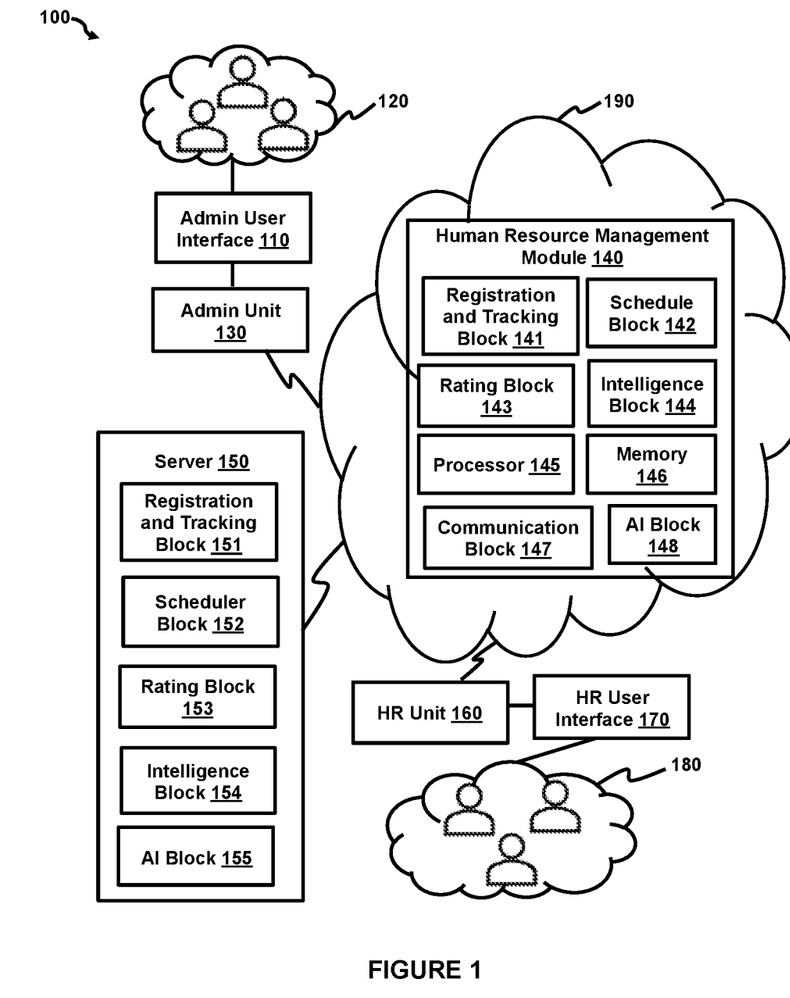
FIG. 1 illustrates an HR (Human Resource) management system for scheduling and managing human resources.

FIG. 1 illustrates an HR (Human Resource) management system ("the system") 100 for scheduling and managing human resources. The system 100 comprises an admin (or "administration") user interface 110, shown as having an admin 120. The admin user interface 110 is communicatively coupled with an administration (admin) unit 130.

The admin 120 may comprise owners, managers, or supervisors, for example, or any other type of person designated with the responsibility of directing the human resource activities of a business or an organization.

The admin user interface 110 comprises suitable logic, circuitry, interfaces, and/or code that may be configured to provide one or more inputs to an HR management module 140 and its associated components, such as those illustrated in FIG. 1. Common admin user interfaces include panels, screens or displays such as an LCD (liquid-crystal display), an LED (Light emitting diode display), for example, which may be touch/point interactive or merely visual. Additionally, the admin user interface 110 may use or may be associated with an input or output device such as a keyboard, a mouse, a joystick, a touch screen, a microphone, a camera, a docking station and/or a speaker. The admin user interface 110 receives inputs through voice commands, clicks, gestures, or taps, for example.

The admin unit 130 is any electronic or data processing device regardless of form-factor. Common units include desktop computers, laptops, pad devices, mobile phones, and specific use (aka "thin") computing devices, for example. In the present invention, the preferred unit is a desktop computer such as the iMac® available from Apple Computers® of California. The admin unit 130 in turn communicates via a data cloud (or "cloud server" or "cloud") 190 with a server 150, an HR unit 160, and an HR user interface 170 associated with a human resource 180, including an employee, a contractor, and a volunteer, for example.

Data clouds, such as the data cloud 190, are well known in the computing arts and include Microsoft's Cognitive Services, the Amazon Cloud, MongoDB, and Big Blue from IBM, among others.

The admin user interface 110 allows the admin 120 to interact with the HR management module 140 through the admin unit 130. In other words, the admin unit 130 maintains a sign up/login page through which the admin 120 accesses the HR management module 140. Although the admin unit 130 is shown as a separate unit/entity outside the HR management module 140, in various embodiments, the admin unit 130 may be integrated with the HR management module 140 and may be implemented via any existing and foreseeable form factor.

The HR management module 140 comprises associated functional blocks, including functional blocks (or simply "blocks") such as a registration and tracking block 141, a schedule block 142, a rating block 143, an intelligence block 144, and a communication block 147, as well as a processor 145, a memory 146 and an artificial intelligence (AI) block 148. In various embodiments of the present invention, the admin 120 may be able to access all the functional blocks of the HR management module 140, while some (or all) may be restricted from individual admins or groups of admins.

The registration and tracking block 141 provides several features for the HR Management System 100. First, it provides a signup sequence, such as an automated bot. The registration and tracking block 141 also allows the admin 120 to sign up and register into the system 100 via the admin user interface 110.

Additionally, the registration and tracking block 141 tracks shifts for empty spot(s) and automatically jumps into or triggers an action when it determines the action is needed. When the registration and tracking block 141 acts, it compiles a list of the human resources that it will offer the spot (including an opening and/or shift) to. Then, the registration and tracking block 141 will reach out to each human resource in a preference order via a suitable channel and have individual "one on one" conversations with each of the human resources in the list until that spot is filled. For example, the registration and tracking block 141 empowers a staffing company to schedule workers for a Super Bowl, where 500 food and beverage servers, 50 managers, 200 valets, and so on, are needed. All of these different human resource needs are grouped in collections called "events".

A "spot" is a scheduled task, shift or other activity in an event. In a fully filled schedule, every spot is assigned to at least one human resource. If a spot is unassigned, then it is said to be 'empty' or 'available.' During operation, the registration and tracking block 141 scans events, and looks for any empty spot(s). If the registration and tracking block 141 determines that not enough human resources are going to sign up for empty spot(s), or that the admin 120 has not filled the one or more empty spots manually, the registration and tracking block 141 triggers action.

Determination that a slot is available is made by considering at least one parameter, and common parameters include: looking at a staffing velocity of a particular event vs the organization's average, roster utilization, and availability of the human resources to fill a spot (as the human resources may be working or busy at another job).

When to locate a human resource is also handled by the registration and tracking block 141. For example, the data cloud may include access to artificial intelligence (AI) such as the Microsoft Cognitive Business Service AI stack using the AI block 148. Whether by algorithm or AI or a combination of an algorithm and AI, a difficulty level of filling the one or more shifts may be determined and this data can then comprise part of the data that can trigger the HR management module 140 to take an action. For example, the higher the difficulty level, and the sooner the shift occurs, the more urgent it is for the registration and tracking block 141 to act. If the registration and tracking block 141 determines that the difficulty in scheduling specific shifts on a regular basis is too high, it may make recommendations to the admin 120 to hire or find additional human resources.

The registration and tracking block 141 is configured to offer a shift in different ways, such as a communication preference(s) set by the human resource 180—for example an SMS or push notifications. However, if the registration and tracking block 141 determines that a need is urgent, and the human resource 180 has disabled their preferred mode of communication (say, push notification), it will select a second mode of communication (such as an SMS message), and so on and may send a single message across multiple communication channels simultaneously. In other words, the registration and tracking block 141 uses the contact methods most likely to be successful based on human resource preferences and organizational needs. In an embodiment, the registration and tracking block 141 can also consider factors such as feedback from phone carriers as to the delivery success of a given message to determine next steps.

Accordingly, the registration and tracking block 141 compiles, sorts, and prioritizes a list of human resources based on one or more factors such as admin-identified criteria and preferences. For example, out of a total roster, the registration and tracking block 141 selects the human resource 180 that 'best" fits the criteria as specified by the admin 120. The registration and tracking block 141 is configured to learn preferences of the admin 120 based on clients, location, and other factors to automatically suggest rules to determine which human resources to select. To illustrate, the admin 120 may say "I need Bartenders available tomorrow at 2:00 p.m. that have an updated driver license." The registration and tracking block 141 then selects a group of workers matching this request and further sorts them in a sorting order that accommodates admin-generated requests, such as admin-identified preferred workers, a star rating (described below), a likelihood to show or no-show (based on a predictive analysis via AI and/or an algorithm), billable hours, wage, a distance from a venue/job location, as well as custom variable(s) as defined by a client, for example. This sorting order generates a prioritized list of human resources ("the list").

Once the registration and tracking block 141 has created the list, it communicates with one or more human resource (s) on the list. For example, the registration and tracking block 141 may open a conversation with one human resource and wait for their response for a predetermined period of time, or open several conversations at once. Alternatively, the registration and tracking block 141 may broadcast (meaning, send simultaneously) a message to every human resource on the list. This is desirable, say, when a need is urgent and it is hard to fill a particular spot with a specific skill set or role. Thus, it is seen that one goal of the system 100 is to communicate with the most desirable and qualified human resources on the list, and offer them the spot(s) first, and then move 'down' the list to the next-most desirable workers, etc.

The schedule block 142 allows the human resource 180 to self-schedule via the human resource unit 160 using the human resource interface 170. For example, the human resource 180 may browse open shifts at his workplace via the human resource unit 160. Preferably, shifts are selectively shown to each human resource based on that human resource's ranking in the list that is dynamically generated for each open slot.

The schedule block 142 accommodates multivariable analysis, as well as AI. For example, events that are far into the future may be available to only the most qualified (or highest-ranked) human resources. In other words, the schedule block 142 can be selective when presenting a slot opportunity to a specific human resource. As a more detailed example, if bartender shifts typically fill within a known window of time before the shift even occurs (say between four hours and two hours before the shift), and a specific shift is not yet in that time-window (say, the day before), then the schedule block 142 can increase its selectivity by making the shift available to perhaps a single bartender. In summary, the schedule block 142 provides/displays shifts, when available, to human resource(s) based on human resource criteria and selective prioritization.

Then, as a slot or shift time nears and remains unfilled, or the difficulty in filling that slot (as determined by the algorithms discussed below) is determined to be high, the schedule block 142 decreases selectivity commensurately. Eventually, the schedule block 142 may determine that selectivity is undesirable, and thus open a slot/shift availability to every human resource who meets a minimum criterion as defined and specified by the admin (e.g., all bartenders with a license).

Ratings, such as a star rating, are one factor in the sorting process. The rating block 143 assigns ratings to each human resource 180, and bases each rating on one or more data points, including: actual star ratings (such as 1-5 stars) given to each human resource by the admin during or after a shift, how long they have worked with the organization (seniority), how often they are on-time or late (late comings), how often they are present or no-show (absents), how many completed shifts they have worked (total shifts served), how many total shifts they have worked in any specific capacity (total shifts served in a specific capacity), and how they have been most recently rated in any specific capacity (recent ratings). Additional rating factors include automated rating factors such as location data gathered from a cell phone or other device during work hours, for example.

In an embodiment, each human resource has multiple star ratings—one for each particular skill or role they perform. For example, each time they work in a new capacity, they start gaining experience in that capacity. More specifically, consider a bartender who works at home-based events and at large public events such as baseball games. The bartender, based on a body of work while at Dodger Stadium, will likely have a different rating than he/she has working as a bartender at private home events. Of course, the "bartender" would have an entirely different rating for working as a manager at a wedding banquet, and so forth. Ultimately, this leads to a multi-dimensional matrix of star ratings for each human resource.

The intelligence block 144 is configured for predictive analysis of one or more instances such as client event density, and roster utilization, for example. To accomplish this, the intelligence block 144 utilizes data collected from past events to estimate when the event will be busy, and determine the days that they tend to utilize so that it can plan for better utilization of resources. This data can be collected, analyzed and deployed on a client basis or across clients of a particular type based on admin identification or AI determination.

Thus, in case of roster utilization prediction, based on currently scheduled and predicted client events, the intelligence block 144 makes recommendations more or less aggressively based on the ease or difficulty to fill slots related to the event with human resources. Additionally, the intelligence block 144 is configured to alert the admin by calling attention to the slots that must be filled with human resources having particular licenses or certifications (or other time sensitive data that needs to be tracked). This data can also be used to remind each such human resource (and/or each admin) to renew the required license(s).

The intelligence block 144 provides additional predictive features to the system 100, such as determining a specific worker's tendencies. For example, if a worker tends to be late on shifts that are more than 25 miles from their house, the HR management module 140 takes this into account when creating the sort order described above. Additionally, the intelligence block 144 may track: a worker's no-show tendencies for shifts when an organization carpool is unavailable, if a worker has no showed lately, admin sentiment (a worker's negative or positive reviews' textual content), and other tendencies and performance issues desired by an organization or as determined important by the AI block 148.

The communication block 147 is configured to establish communication between external devices via at least one network. The hardware and software common to the communication block 147 are similar to other communication blocks used by those of skill in the electronic communications arts, and the invention incorporates these and other equivalent and foreseeable communication blocks.

The AI block 148 is configured to make all kinds of decisions in accordance with the present invention. The AI block 148 utilizes machine learning method that enables the system 100 to automatically learn and improve from experience, over a period of time, without being explicitly programmed. One deep learning method uses a neural network capable of learning in an unsupervised manner from data that is unstructured or unlabeled. Deep learning is a method of machine learning that employs multiple layers of neural networks that enable the platform of the present invention to teach itself through inference and pattern recognition, rather than development of procedural code or explicitly coded software algorithms (however, machine learning is augmented and enhanced with software algorithms). The neural networks are modeled according to the neuronal structure of a mammal's cerebral cortex, where neurons are represented as nodes and synapses are represented as uniquely weighted paths or "tolled roads" between the nodes. The nodes are then organized into layers to comprise a network. Additionally, the neural networks are organized in a layered fashion that includes an input layer, intermediate or hidden layers, and an output layer.

Figure 2:
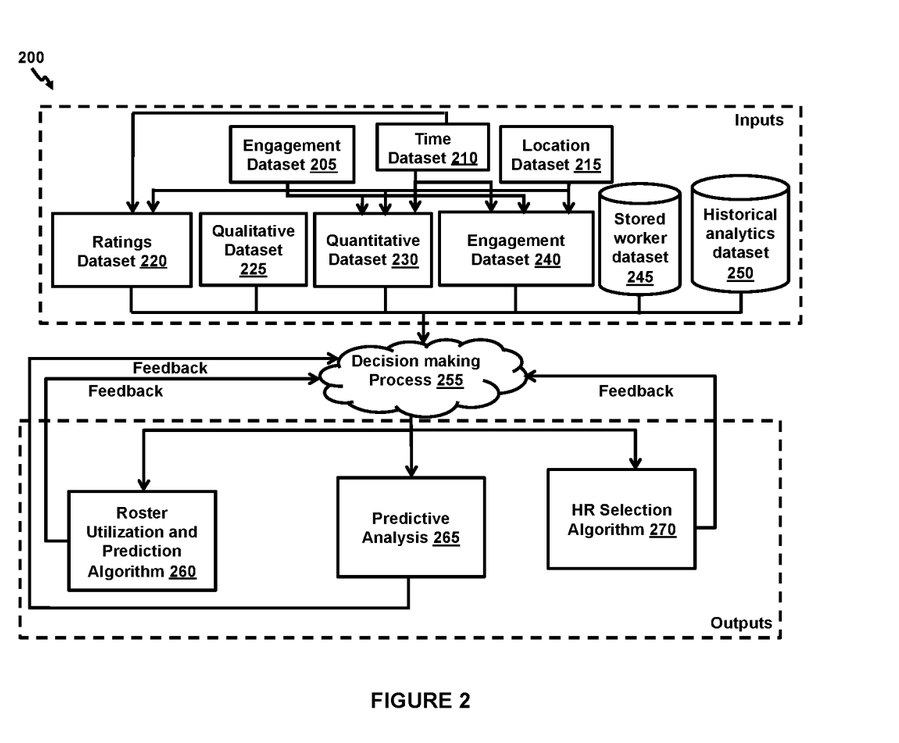
FIG. 2 illustrates one data-relationship, called HR management data relationships.

The neural networks enhance their learning capability by varying the uniquely weighted paths based on received input. The successive layers within the neural network incorporate the learning capability by modifying their weighted coefficients based on their received input patterns. From this foundation, one can see that the training of the neural networks is very similar to how we teach children to recognize an object. The neural network is repetitively trained from a base data set, where results from the output layer (or, simply "output") are successively compared to the correct classification of the image. Similarly, in the present invention, a training data set is developed from a plurality of datasets like real-time datasets 205, 210, 215, stored historical dataset 245, 250, and data derived from historical and near real-time dataset 220, 225, 230, and 240, for example, to enhance the learning capability of the AI block 148. Alternatively, any machine learning paradigm instead of neural networks can be used in the training and learning process.

In various embodiments of the present invention, the HR management module 140 is located in the cloud server 190, but may also be located in a local memory. Although separate functional blocks in the resource management module 140 have been shown and described as performing various functionalities, it is appreciated that the HR management module 140 can be configured to perform such functionalities alone.

Further, the functional units such as the registration and tracking block 141, the schedule block 142, the rating block 143, the intelligence block 144 and the AI block 148, for example may be located out of the cloud 190 and operate, for example, at the server 150. Accordingly, the functional blocks of the software maintained on the server 150 perform analogous operations as the functional blocks of the HR management module 140 explained above, and shown here as a registration and tracking block 151, a schedule block 152, a rating block 153, an intelligence block 154 and an AI block 155.

The server 150 may maintain a local database, and may comprise one or more trained machine learning models having training data, as known to those with ordinary skill in the computing arts.

The human resource unit 160 is configured to provide access to the HR management module 140 via the HR user interface 170. Thus, the HR user interface 170 allows interaction of the human resource 180 with the HR management module 140. The human resource unit 160 comprises the software that provides a sign up/login page through which the human resource 180 accesses the HR management module 140. Although the human resource unit 160 is shown as a separate unit existing outside the HR management module 140, in various embodiments the human resource unit 160 is integrated with the HR management module 140. The human resource 180 may provide access to the functional units of the HR management module 140 to each human resource, as appropriate for that human resource.

Like the admin unit 130, the human resource unit 160 is an electronic device. The electronic device may be a smartphone, a laptop, a pager, a tablet computer, or a desktop computer, for example. The human resource unit 160 comprises suitable logic, circuitry, interfaces, and/or code that communicates with the HR management module 140 and its blocks. The human resource user interface 170 may be a screen or a display such as an LCD (liquid-crystal display), an LED (Light emitting diode display), or any other input/output device known to those of skill in the computing arts. Additionally, the human resource user interface 170 may communicate with a keyboard, a mouse, a touch-pad, a joystick, a touch screen, a microphone, a camera, a docking station and/or speaker (s), and may receive inputs through voice commands, clicks and taps, for example.

FIG. 2 illustrates one data-relationship, called HR management data relationships 200, which is used by the HR management system 100 to allocate spots to the human resource 180. From FIG. 2 it is apparent that the HR management module 140 considers the plurality of datasets, such as an engagement dataset 205, a time dataset 210, a location dataset 215, for example.

The engagement dataset 205 comprises data related to each human resource's engagement with the HR management system 100, such as how often (i.e., engagement frequency) a human resource engages with the HR management module 140. Accordingly, the engagement dataset 205 helps determine human resource activity levels and responsiveness. Additionally, the engagement dataset 205 can, for example, include data associated with a human resource "check in" for a shift, login times, how often they login, how often they look for available shifts, how often they update their own personal availability, how often they are responsive to text messages, push notifications, emails, as well as other alerts. In other words, the engagement dataset 205 is used to decide how often and across which and how many channels (e.g., chat, phone, text, notifications, etc.) to contact the human resource.

The time dataset 210 comprises timestamp data for different actions. For example, the time dataset 210 includes data related to worker no-show event and rates, as well as 'clock in/out' times and equivalents. Then, the HR management module 140 can consider time data when offering spots to a human resource. This time-based information is also used in a roster utilization and prediction algorithm 260, predictive analysis 265 and in a human resource selection algorithm 270 as described below.

The location dataset 215 comprises GPS data, for example, including the location of the human resource at work and when a human resource location is queried for determination of who to offer a spot to. Data from the location dataset 215 is then used to rate workers by functions of the location where an event occurs, such as onsite check-ins versus off-site check-ins, improperly located check-ins, and related derived statistics, such as their percentage of on-site punches versus missing or incorrect location punches.

Because datasets are convenient organizations of data, the data in them, as well as data and statistics derived from them, can be copied or otherwise organized into secondary datasets, such as a ratings dataset 220, a qualitative dataset 225, a quantitative dataset 230, and an engagement dataset 240, for example.

Data maintained in the ratings dataset 220 may be used in a predictive analysis 265 which is used to compute 'star ratings' (discussed below). The qualitative dataset 225 includes data such as an admin review as described above, which may include textual data such as "Good job today Mike, but please make sure you have the correct uniform next time". The HR management module 140 is preferably configured to parse text data to analyze sentiment and trends for management, and is also used in the predictive analysis 265.

Data in the quantitative dataset 230 includes objective data as measured and collected by the HR management system 100. Examples of quantitative dataset includes, for example, a number of shifts worker failed to show up for over a defined period of time, how close to actual shift time the worker gives notice of his/her upcoming absence (e.g., two hours before vs. two days before vs. no notice at all). This information is also used in the predictive analysis 265.

Additional data that can be used in the predictive analysis 265 includes worker capability, skill set, sincerity, attendance, and availability during crucial hours, for example.

Data from the engagement dataset 240 includes data related to late arrivals and clock-ins for a spot, no-show to work, reliability of clocking-in, length of break times, and other indicators of user engagement which indicate human resource enthusiasm and reliability. In one embodiment, the engagement dataset 240 includes an invite to work approval rate (a/k/a the "invite to work rate"). When employing the invite to work rate, customers are presented with the ability to invite specific workers to specific shifts (such as identifying a preferred massage therapist, for example). Then, the human resource invited can accept or decline the invitation. The rate at which a human resource accepts specific invitations is the invite to work rate. The engagement dataset is then used in the predictive analysis 265, and may also be used in the HR selection algorithm 270.

The HR management data relationships 200 include stored worker dataset 245. The stored worker dataset 245 includes data related to each human resource's personal information including their home address, phone numbers, email addresses, worker identification numbers, as well as government-provided and government-required information, for example.

A specific example of matching a 'best fit' (or 'most ideal') human resource to a slot, an event may require human resources that live in Detroit and have had a negative COVID test in the last 24 hours. The HR management system 100 has ideally already collected this data from the human resources, and this data is then used to determine the most ideal human resource for each slot in the HR selection algorithm 270. The HR selection algorithm 270 can also match slots with human resources who hold specific licenses, as well as information related to those licenses such as the cities and/or states where the licenses are active, license numbers, and when those licenses expire.

The HR management data relationships 200 also includes a historical analytics dataset 250. The historical analytics dataset 250 comprises the totality of data available to each administrator ("admin") 120. The historical analytics dataset 250 is used to predict trends in a roster utilization and prediction algorithm 260. For example, consider roster utilization, which means the percentage of the overall roster that is typically used for an event based on that event's specific and selected criteria.

Likewise, the HR selection algorithm 270 uses information from the historical analytics dataset 250 to predict contemporaneous or future event staffing. For example, the HR selection algorithm 270 can predict human resource needs and availability on, say, December $24^{th}$, or during months associated with high vacation rates, as well as how many events (including shifts) are typically held for a particular client or client type over a defined period of time.

Accordingly, data obtained in near real-time datasets 205, 210, 215, stored historical data 245, 250, and data derived from historical and near real-time data 220, 225, 230, and 240 come together for use in algorithms 255, 260, 265, and 270 to match the most desirable human resources to one or more slot openings, and to predict the availability of human resources to fill those slots so that the admin 120 may take proactive steps to insure that adequate (or the desired) human resource(s) are available to meet the needs of customers. Feedback of the algorithms 260, 265, and 270 is further continuously provided to the algorithm 255, which is a decision making process 255 through the AI block 148.

Figure 3:
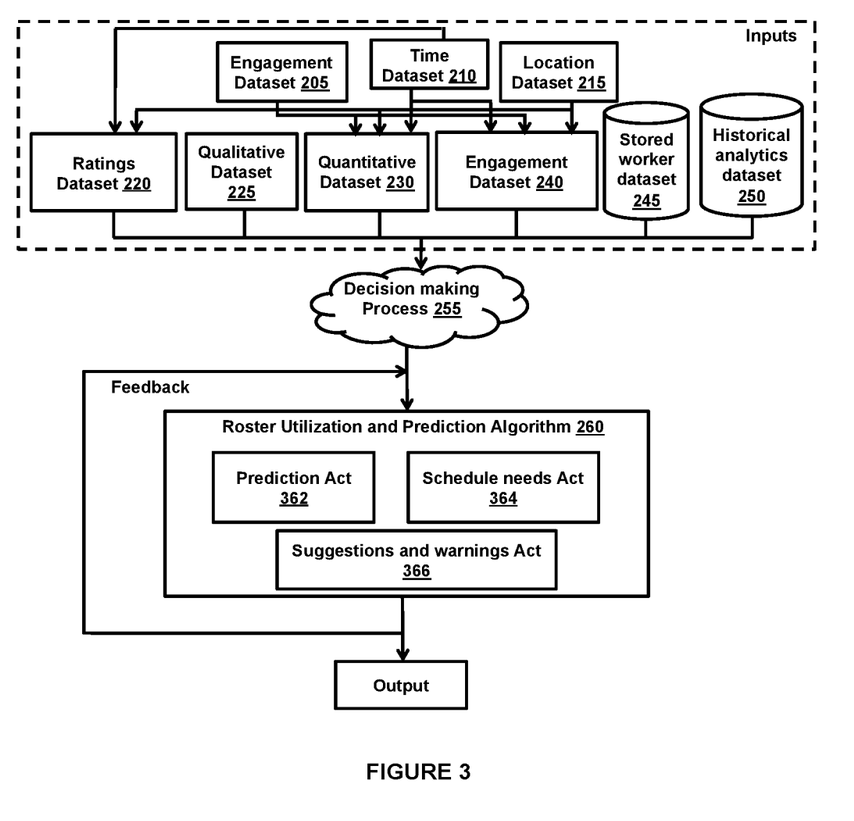
FIG. 3 provides details of a roster utilization and prediction algorithm in conjunction with FIG. 2.

FIG. 3 provides additional details of the roster utilization and prediction algorithm 260. The roster utilization and prediction algorithm 260 inputs from datasets 220, 225, 230, 240, 245 and 250. Data from the datasets are used in a prediction act 362 to estimate a number of human resources needed for a particular event, and to estimate a number of available human resources matching identified criteria, as well as an estimated number of human resources that will sign up based on recent and historical work engagement.

In a schedule needs act 364, data provided by the historical analytics dataset 250 such as (on an individual and aggregate basis) current schedule information for available human resources, historical data regarding client events, the human resources used at those events, is used to estimate the needed human resources for a particular event, and for human resources that are needed across a set of events occurring at conflicting times.

Based on needed human resources estimated by the prediction act 362 and the schedule needs act 364, a suggestions and warnings act 366 is invoked. In the suggestions and warnings act 366, the HR management system 100 generates and provides suggestions and warnings as a function of current human resource needs, as well as predicted human resource needs by comparing similar needs related to historical events.

Figure 4:
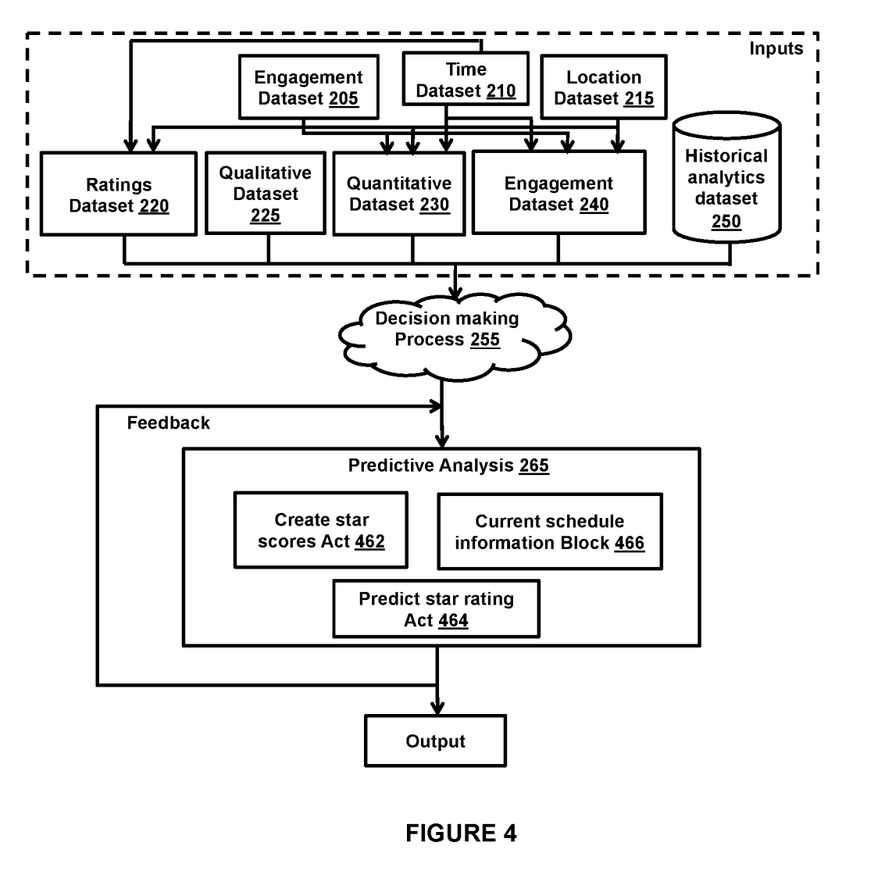
FIG. 4 provides details of predictive analysis and generation of star ratings in conjunction with FIG. 2.

FIG. 4 provides additional details of the predictive analysis 265 and its generation of star ratings. The predictive analysis 265 is based on the plurality of datasets explained above and shown in the below Table of Star Rating Factors:

Ratings Dataset 220
Qualitative Dataset 225
Quantitative Dataset 230
Engagement Dataset 240
Historical Analytics Dataset 250

First, in a create star scores act 462, each human resource's performance data—as entered by administrators and data automatically recorded by the HR management system 100—are gathered to create a star score for each human resource.

Next, in a predict star rating act 464 the scores are projected based on recent trends in the human resource's behavior, and information related to the organization's current open spots, represented by a current schedule information block 466. This projection defines one aspect of a predictive analysis 265. The predictive analysis 265 is preferably performed by the intelligence block 144.

Further, the human resource selection algorithm 270, namely human resource filtering via a filter human resources algorithm may be implemented. In the filter human resources algorithm, human resources are filtered based on shift needs, time restraints and overall current and expected performance balance. In addition to factors used to determine star ratings in the predictive analysis act 265, the filter human resources algorithm utilizes open event-specific factors such as a roster utilization and prediction.

Figure 5:
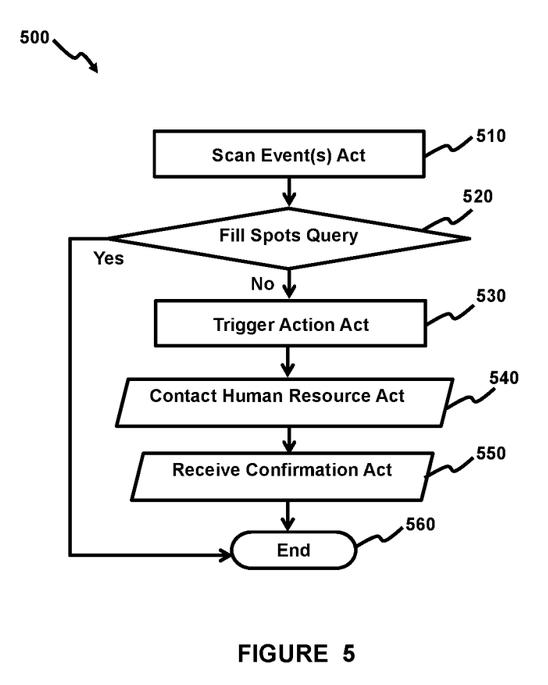
FIG. 5 illustrates a scheduling and managing algorithm.

FIG. 5 illustrates a scheduling and managing algorithm 500. The scheduling and managing algorithm 500 begins in a scan event(s) act 510, in which the registration and tracking block 141 scans one or more events for an organization to identify empty spots. The scan may take the form of a structured data query, an unstructured data search, or by API queries made to one or more organization data sources. After an empty spot is identified, then the scheduling and managing algorithm is triggered to proceed to a fill spots query 520.

In the fill spots query 520, the algorithm 500 queries the memory 146. The fill spots query 520 first queries the memory 146 to determine if an administrator has identified and allocated a human resource to that slot; if so, then the algorithm 500 flags the spot as "filled" and proceeds to an end act 560 as indicated by the "Yes" path.

Similarly, the fill spots query 520 next queries the memory 146 to determine if one or more human resource(s) have requested to work one or more unfilled spots. If so, for each human resource meeting the minimum qualifications for a desired human resource for a particular slot, then the algorithm 500 assigns the most desirable human resource to that spot, flags the spot as "filled," and proceeds to an end act 560 as indicated by the "Yes" path.

If, however, the fill spots query 520 determines one or more empty spots remain unfilled, the algorithm 500 proceeds along the "No" path to a trigger action act 530. In the trigger action act 530, the registration and tracking block 141 generates a priority-based list of the human resources that the HR management system 100 will automatically offer the shift. Factors used to generate the list are discussed above, and include, for example the algorithm may use any factors in the below Table of Factors to determine a most desirable human resource for a specific spot.

| |
|---|
| Ratings Dataset 220 |
| Qualitative Dataset 225 |
| Quantitative Dataset 230 |
| Engagement Dataset 240 |
| Stored Worker Dataset 245 |
| Historical Analytics Dataset 250 |

After generating the list, the HR management system 100 sends a communication to the most desired human resource to fill that specific spot in a contact human resource act 540. In the contact human resource act 540, the HR management system 100 may open a conversation with one human resource at a time and wait a predetermined period of time for a response from that human resource, or the HR management system 100 may simultaneously open a plurality of conversations with human resources.

Next, in a receive confirmation act 550, the registration and tracking block 141 receives a human resource's confirmation that they will work the offered spot, and the algorithm 500 tags that spot as filled before proceeding to an end act 560.

Figure 6:
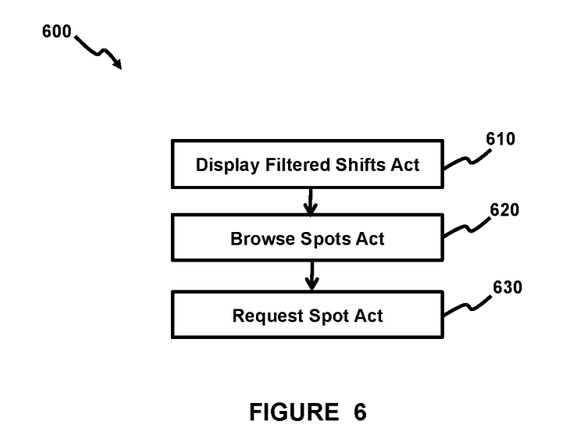
FIG. 6 shows a self-scheduling algorithm that provides a human resource the ability to initiate and schedule a spot.

Viewing a human resource's interaction with the HR management system 100 provides additional clarity of the invention. Accordingly, FIG. 6 shows a self-scheduling algorithm 600 that provides a human resource the ability to initiate and schedule a spot, such as a shift.

The self-scheduling algorithm 600 begins in a display filtered shifts act 610 in which the self-scheduling algorithm 600 presents to a human resource the spots that are available (a/k/a "open") to him/her to browse (to 'look for') based on selectivity as described previously.

Next, in a browse spots act 620, the self-scheduling algorithm 600 receives inputs related to a human resource browsing open spots available to him/her at his workplace or remotely via the schedule block 142.

Then, in a request spot act 630, the self-scheduling algorithm 600 receives a human resource's selection of an available spot. Thus, the self-scheduling algorithm 600 allows a human resource to craft their own schedule one spot/shift at a time, thus leading to greater human resource satisfaction, higher administrator and organization satisfaction, and happier customer experiences.

Figure 7:
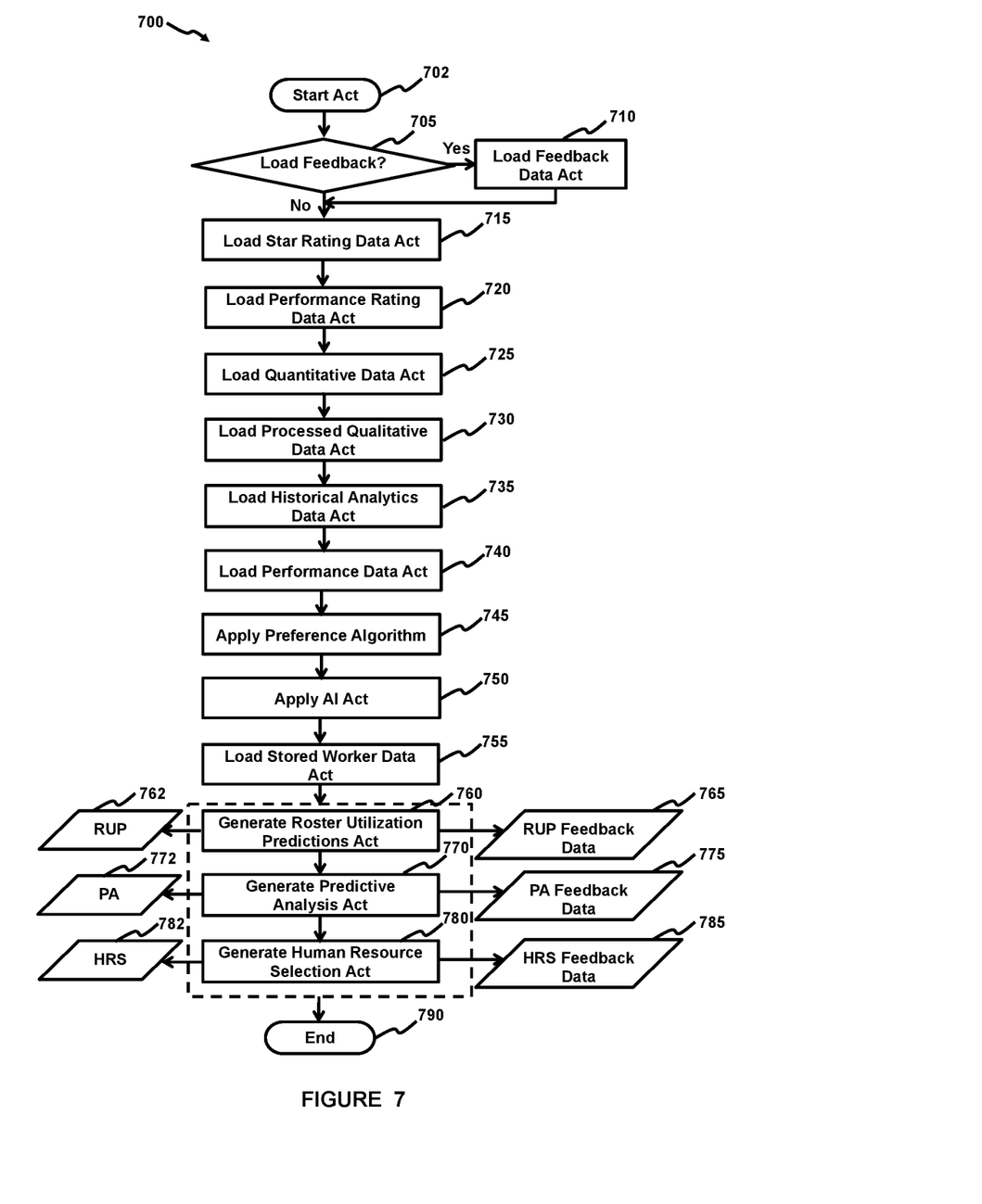
FIG. 7 shows a human resources allocation algorithm.

FIG. 7 shows a human resources allocation algorithm 700. The human resources allocation algorithm 700 begins in a start act 702. The start act 702 is triggered by receiving an administrative request or by receiving an indication through automation about need for the human resource(s). The need for the human resource(s) may be for an individual employee, a specific employee, or a group of slots that needs to be filled, for example.

After initiation, the human resources allocation algorithm 700 is triggered to proceed to a load feedback query 705, where it is determined whether to load feedback data or not. The feedback data may be the data generated by the decision making process 255. If the feedback data is to be loaded, then the human resources allocation algorithm 700 proceeds to a load feedback data act 710 as indicated by the "Yes" path. The loaded feedback data includes roster utilization predictions (RUP) feedback data 765, predictive analysis (PA) feedback data 775 and human resource selection (HRS) feedback data 785.

If the feedback data does not exist or is not supposed to be loaded, then the human resources allocation algorithm 700 proceeds to a load star rating data act 715 and a load performance rating data act 720 into the decision making process 255, where star rating data and performance data are loaded from the rating dataset 220. The star rating data and performance data may include at least one of: actual star ratings (such as 1-5 stars) given to each human resource by the admin during or after a shift, how long they have worked with the organization (seniority), how often they are on-time or late (late comings), how often they are present or no-show (absents), how many completed shifts they have worked (total shifts served), how many total shifts they have worked in any specific capacity (total shifts served in a specific capacity), and how they have been most recently rated in any specific capacity (recent ratings).

Next, the human resources allocation algorithm 700 proceeds to a load quantitative data act 725. The load quantitative data act 725 loads the quantitative dataset 230 into the decision making process 255. Examples of quantitative dataset includes, for example, a number of shifts worker failed to show up for over a defined period of time, how close to actual shift time the worker gives notice of his/her upcoming absence (e.g., two hours before vs. two days before vs. no notice at all).

Next, the human resources allocation algorithm 700 proceeds to a load processed qualitative data act 730. The load processed qualitative data act 730 loads the qualitative dataset 225 into the decision making process 255 that includes data such as an admin review as described above, which may include textual data such as "Good job today Mike, but please make sure you have the correct uniform next time".

Further, the human resources allocation algorithm 700 proceeds to a load historical analytics data act 735 and a load performance data act 740. The load historical analytics data act 735 comprises the totality of data available to each administrator 120, which is loaded into the decision making process 255 and the load performance data act 740 loads the engagement dataset 240 into the decision making process 255. The engagement dataset 240 includes data related to late arrivals and clock-ins for a spot, no-show to work, reliability of clocking-in, length of break times, and other indicators of user engagement which indicate human resource enthusiasm and reliability.

The human resources allocation algorithm 700 further proceeds to an apply preference algorithm 745. The preference algorithm 745 identifies and matches a 'best fit' (or 'most ideal') human resource to a slot ("open slot") individually or as a group based on a balance of the factors defined or selected by the admin 120.

Then, the human resources allocation algorithm 700 proceeds to an apply AI in an apply AI act 750. In the apply AI act 750, all of the inputs from all of the sources, for example, the plurality of datasets or any other relevant stored or historical data can be used to identify and match the 'best fit' (or 'most ideal') human resource to a slot ("open slot").

Next, the human resources allocation algorithm 700 proceeds to a load stored worker data act 755. The load stored worker data act 755 helps neutrally identifying the 'best fit' (or 'most ideal') human resource to a slot ("open slot") without consideration of factors that might be illegal to consider and then, the HR is matched with their real identities (e.g., who they are in the real world) when the stored worker data is loaded into the decision making process 255.

The outputs of all the above acts, i.e., the output of the decision making process 255 results in roster utilization predictions (RUP) 762, predictive analysis (PA) 772 and human resource selection (HRS) 782 simultaneously as described above in conjunction with FIG. 2 through FIG. 4. In other words, the human resources allocation algorithm 700 proceeds to a generate roster utilization predictions act 760, a generate predictive analysis act 770 and a generate human resource selection act 780 that result in an output that can immediately be used as the roster utilization predictions (RUP) 762, the predictive analysis (PA) 772 and the human resource selection (HRS) 782 respectively. The generate roster utilization predictions act 760, the generate predictive analysis act 770 and the generate human resource selection act 780 also result in feedback data like RUP feedback data 765, PA feedback data 775 and FIRS feedback data 785 respectively that may be used or loaded into the decision making process 255 for future processing and iteration. The human resources allocation algorithm 700 ends at an end act 790.

It may be noted that the human resources allocation algorithm 700 is explained to have above stated acts; however, those skilled in the art would appreciate that the human resources allocation algorithm 700 may have more/less number of acts, which may enable all the above stated implementations of the present invention. The various actions, acts, blocks, steps, or the like in the human resources allocation algorithm 700 and other flowcharts may be performed in the order presented, in a different order or simultaneously. Further, in some implementations, some of the actions, acts, blocks, steps, or the like may be omitted, added, modified, skipped, or the like without departing from the scope of the present invention.

Although the invention has been described and illustrated with specific illustrative embodiments, it is not intended that the invention be limited to those illustrative embodiments. Those skilled in the art will recognize that variations and modifications can be made without departing from the spirit of the invention. Therefore, it is intended to include within the invention, all such variations and departures that fall within the scope of the appended claims and equivalents thereof.

What is claimed is:

1. A system for scheduling and managing human resources, comprising:
   a processor;
   a memory coupled to the processor, the memory storing instructions executable by the processor to implement a human resource management module, the human resource management module comprising:
      a registration and tracking block, wherein the registration and tracking block tracks a first shift for at least one first empty spot associated with the human resources in an organization and triggers an action when the at least one first empty spot is detected, wherein the action is defined as a triggered action, wherein the human resources comprise at least one of an employee, a contractor and a volunteer, wherein the triggered action includes:
         compile a list of human resources based on at least one factor, wherein the at least one factor comprises admin-identified criteria and preferences; and
         transmit, via a network interface coupled to the processor, a notification to a mobile device associated with each of the human resources on the list, the notification prompting the human resources to confirm attendance for the first shift through a user interface of the mobile device, and receive, via the network interface, confirmation data from the mobile device to update the schedule block in real-time, wherein the action is triggered when the at least one first empty spot is detected, it is determined, based on at least one parameter, that not enough human resources will sign up for the at least one first empty spot, or that an admin has not filled the at least one first empty spot;
      upon determining that the registration and tracking block identifies a difficulty in scheduling the at least one first empty spot on a regular basis, the registration and tracking block provides recommendations to the admin to hire additional human resources;
      a schedule block configured to facilitate self-scheduling allowing the human resources to craft their own schedule one shift at a time, the schedule block configured to display one or more filtered shifts to the human resources based on selectivity, wherein the selectivity is modifiable based on situation, wherein the schedule block determines that the selectivity is undesirable, and the schedule block opens shift availability to every human resource who meets a minimum criterion as defined and specified by the admin;
      a rating block configured to determine rating of each human resource by the admin based on one or more data points;
      an intelligence block configured to predict one or more instances, wherein the one or more instances include client event density and roster utilization, wherein the intelligence block uses admin feedback and evaluation to train an artificial intelligence system, and wherein the intelligence block determines, in conjunction with an artificial intelligence system, optimizes the scheduling process by:
         determining a likelihood of the human resource's specific performance occurring during a future event based on historical analytics data; and
         dynamically adjusting the selectivity of the schedule block to prioritize human resources with a predicted performance likelihood above a threshold, thereby reducing scheduling conflicts and improving roster utilization efficiency;
      the intelligence block configured to alert the admin by calling attention to the at least one first empty spot that is important to fill with the human resources; and
      the intelligence block tracks at least one of: a worker's no-show tendencies for the first shift when an organization carpool is unavailable, if a worker has no showed lately, admin sentiment, and performance issues desired by an organization using the artificial intelligence;
      wherein the human resource management module is configured for predictive analysis, using the intelligence block and the artificial intelligence system executed on the processor by: processing: a plurality of datasets and a historical analytics dataset stored in the memory, wherein the plurality of datasets includes a rating dataset, a qualitative dataset, and an engagement dataset;
      creating a score for each criterion by applying a machine-learning model to combine performance data of the human resources, wherein the machine-learning model is trained to weigh the datasets based on admin feedback; and projecting the score using a time-series analysis algorithm to identify recent trends in the human resource's behavior, thereby enabling the schedule block to dynamically adjust shift assignments to minimize no-show risks and optimize the organization's current open spots.

2. The system of claim 1 wherein the at least one parameter is roster utilization, and availability of the human resources to take the first shift wherein the registration and tracking block calculates the at least one parameter by processing scheduling data stored in the memory to determine whether the at least one first empty spot requires the triggered action.

3. The system of claim 1 wherein the registration and tracking block compiles the list of the human resources based on the one or more factors by:

selecting the human resources, out of a total roster stored in the memory, that fit in a criteria as specified by the admin; and sorting the selected human resources in a specific order: preferred workers as specified by the admin, star rating, likelihood to no-show based on the predictive analysis, billable hour, wage, distance from job location, and custom variable as defined by a client.

4. The system of claim 1 wherein the registration and tracking block is configured to learn preferences of the admin by applying a machine-learning model executed by the processor based on clients, location, and other factors to automatically suggest rules to determine which human resources to select.

5. The system of claim 1 wherein the schedule block, executed by the processor, is configured to:

increase the selectivity by displaying, via a user interface, only the shifts to the human resources that are higher on sorting, wherein the selected human resources are sorted by the processor in a specific order based on: preferred workers as specified by the admin, star rating, likelihood to no-show as determined by the predictive analysis of the intelligence block, billable hour, wage, distance from job location calculated using location data, and a custom variable as defined by a client; or decrease the selectivity by expanding the display of shifts when a shift date approaches, remains unfilled or encounters difficulty in filling; or remove the selectivity and display the shift via the user interface to all of the human resources who meet the criteria as specified by the admin.

6. The system of claim 1 wherein the one or more data points used by the rating block include: actual star ratings given by the admin after each shift to the human resources, seniority, late arrivals, absences, total shifts served, total shifts served in a specific capacity, recent ratings, feedback comments and location data stored in the memory and wherein the one or more instances predicted by the intelligence block include the client event density and roster utilization.

7. The system of claim 1, wherein the human resource management module is further configured for roster utilization predictions, using the intelligence block and the artificial intelligence system executed on the processor, based on a plurality of datasets, a stored worker dataset and a historical analytics dataset, wherein the plurality of datasets corresponds to a rating dataset, a qualitative dataset, a quantitative dataset, and an engagement dataset;

predicting a number of available human resources with each criteria by utilizing the plurality of datasets and the stored worker dataset;

predicting probable number of the human resources that will sign up based on recent and historical work engagement;

creating a predicted and current schedule needs based on the historical analytics dataset; and creating suggestions and warnings displayable via a user interface based on both current needs and predicted needs.

8. The system of claim 1, wherein the plurality of datasets includes a rating dataset, a qualitative dataset, a quantitative dataset, and an engagement dataset each stored in the memory.

9. A method for scheduling and managing human resources, executed by a processor accessing a memory storing instructions, the method comprising:

tracking, by a registration and tracking block implemented by the processor, a first shift for at least one first empty spot associated with human resources in an organization, wherein the human resources comprise at least one of an employee, a contractor and a volunteer; and triggering, by the registration and tracking block, an action when the at least one first empty spot is detected, wherein the action is defined as a triggered action that includes:

compiling a list of human resources based on at least one factor, wherein the at least one factor comprises admin-identified criteria and preferences; and transmitting, via a network interface coupled to the processor, a notification to a mobile device associated with each of the human resources on the list, the notification prompting the human resources to confirm attendance for the first shift through a user interface of the mobile device, and receiving via the network interface confirmation data from the mobile device to update a schedule block in real-time;

wherein the action is triggered when the at least one first empty spot is detected and it is determined based on at least one parameter, that not enough human resources will sign up for the at least one first empty spot, or that an admin has not filled the at least one first empty spot, wherein upon determining that the registration and tracking block identifies a difficulty in scheduling the at least one first empty spot on a regular basis, the registration and tracking block provides recommendations to the admin to hire additional human resources;

facilitating, by a schedule block implemented by the processor, self-scheduling;

displaying, by the schedule block via a user interface, one or more filtered shifts to the human resources based on selectivity, wherein the selectivity is modifiable based on a situation, wherein the schedule block determines that the selectivity is undesirable, and the schedule block opens shift availability to every human resource who meets a minimum criterion as defined and specified by the admin;

determining, using a rating block implemented by the processor, a rating of each human resource by the admin based on one or more data points; and predicting by an intelligence block implemented by the processor, one or more instances, wherein the one or more instances include client event density and roster utilization, wherein the intelligence block in conjunction with the artificial intelligence system optimizes the scheduling process by determining a likelihood of the human resource's specific performance during a future event based on historical analytics data; and dynamically adjusting the selectivity of the schedule block to prioritize human resources with a predicted performance likelihood threshold, thereby reducing scheduling conflicts and improving roster utilization efficiency;

alerting by the intelligence block the admin by calling attention to the at least one first empty spot that is important to fill with the human resources;

tracking by the intelligence block at least one of: a worker's no-show tendencies for shifts when an organization carpool is unavailable, whether a worker has no showed recently, admin sentiment, and performance issues desired by an organization using the artificial intelligence system; and performing predictive analysis, using the intelligence block and the artificial intelligence system, by: processing a plurality of datasets and a historical analytics dataset stored in the memory, wherein the plurality of datasets includes a rating dataset, a qualitative dataset, a quantitative dataset, and an engagement dataset;

creating a score for each criterion by applying a machine-learning model to combine performance data of the human resources, wherein the machine-learning model is trained to weigh the datasets based on the admin feedback; and projecting the score using a time-series analysis algorithm to identify recent trends in the human resource's behavior, thereby enabling the schedule block to dynamically adjust shift assignments to minimize no-show risks and optimize the organization's current open spots.

10. The method of claim 9 further comprising:
increasing the selectivity by displaying via a user interface a shift only to the human resources that are higher on sorting; or decreasing the selectivity when a shift date nears and/or remains unfilled and/or in case of difficulty in filling of the shift; or removing the selectivity and shows the shift to all of the human resources who meet the criteria as specified by the admin.

11. The method of claim 9 further comprising determining, by a rating block, rating based on one or more data points, wherein the one or more data points include:
actual star ratings given by the admin after each shift to the human resources, seniority, late comings, absents, total shifts served, total shifts served in a specific capacity, recent ratings, feedback comments and location data.

12. The method of claim 9 wherein the at least one parameter is roster utilization, and availability of the human resources to take the first shift, wherein the registration and tracking block calculates the at least one parameter by processing scheduling data stored in the memory.

13. The method of claim 9 wherein compiling the list of the human resources based on the one or more factors comprising:
selecting from a total roster stored in the memory the human resources, out of a total roster, that fit in a criterion as specified by the admin; and sorting the selected human resources in a specific order: preferred workers as specified by the admin, star rating, likelihood to no-show based on predictive analysis, billable hour, wage, distance from job location, and custom variable as defined by a client.

14. The method of claim 9 further comprising learning, through machine learning, preferences of the admin based on clients, location, and other factors to automatically suggest rules to determine which human resources to select.

15. The method of claim 9 further comprising performing roster utilization predictions, using the intelligence block and the artificial intelligence system executed by the processor, by:
processing, a plurality of datasets, a stored worker dataset and a historical analytics dataset stored in the memory, wherein the plurality of datasets includes a rating dataset, a qualitative dataset, a quantitative dataset, and an engagement dataset:

predicting by the intelligence block a number of available human resources for each criterion by applying a machine-learning model to the plurality of datasets and the stored worker dataset;

predicting by the intelligence block a probable number of the human resources that will sign up based on recent and historical work engagement using a time-series analysis algorithm;

generating a predicted and current schedule needs based on the historical analytics dataset; and generating suggestions and warnings displayed via the user interface based on both current needs and predicted needs.

* * * * *